United States Patent
Milan et al.

(10) Patent No.: US 11,642,709 B1
(45) Date of Patent: May 9, 2023

(54) OPTIMIZED FLUX ERH ELECTRODE

(71) Applicant: TRS Group, Inc., Longview, WA (US)

(72) Inventors: David M. Milan, Munster, IN (US);
Jason Ozolins, Fife Lake, MI (US);
Eric Maki, Temple Terrace, FL (US);
James W. Erario, Indianapolis, IN (US); Amy Wagner, Chicago, IL (US);
Mark Boulos, Indianapolis, IN (US);
Sean M. Fournier, Indianapolis, IN (US)

(73) Assignee: TRS Group, Inc., Longview, WA (US)

( * ) Notice: Subject to any disclaimer, the term of this patent is extended or adjusted under 35 U.S.C. 154(b) by 154 days.

(21) Appl. No.: 17/191,897

(22) Filed: Mar. 4, 2021

(51) Int. Cl.
*B09C 1/06* (2006.01)
*B09C 1/02* (2006.01)

(52) U.S. Cl.
CPC .............. *B09C 1/062* (2013.01); *B09C 1/02* (2013.01); *B09C 2101/00* (2013.01)

(58) Field of Classification Search
CPC .................................. B09C 1/06; B09C 1/062
USPC .................................. 405/37, 128.35, 128.4
See application file for complete search history.

(56) References Cited

U.S. PATENT DOCUMENTS

| | | | |
|---|---|---|---|
| 1,058,380 A | 4/1913 | Monnot | |
| 1,372,743 A | 3/1921 | Gardner | |
| 1,516,836 A | 11/1924 | Williamson | |
| 1,911,063 A | 5/1933 | Daly | |
| 2,112,729 A | 3/1938 | Abbott | |
| 2,499,961 A | 3/1950 | Lennox | |
| 2,685,930 A | 8/1954 | Albaugh | |
| 2,722,278 A | 11/1955 | Kaasa | |
| 2,799,641 A | 7/1957 | Bell | |
| 2,801,090 A | 7/1957 | Hoyer et al. | |
| 2,818,118 A | 12/1957 | Dixon | |
| 2,902,270 A | 9/1959 | Salomonsson et al. | |
| 3,106,244 A | 10/1963 | Parker | |
| 3,137,347 A | 6/1964 | Parker | |
| 3,149,672 A | 9/1964 | Orkiszewski et al. | |

(Continued)

FOREIGN PATENT DOCUMENTS

| | | | | |
|---|---|---|---|---|
| AU | 2002365145 A1 | * | 7/2003 | ........... B01D 53/002 |
| AU | 2006323431 A1 | * | 7/2008 | ............... B09C 1/06 |

(Continued)

OTHER PUBLICATIONS

Technical Memorandum Regarding Bench Scale VEG REsearch & Development Study: Implementation Memorandum for Ex-Situ Thermal Desorption of Perfluoroalkyl Compounds (PFCs) in Soils, Endpoint Consulting, Inc., Mehrdad Javaherian, Phd., Pe, Leed GA, Feb. 26, 2016.

(Continued)

*Primary Examiner* — Frederick L Lagman
(74) *Attorney, Agent, or Firm* — Barnes & Thornburg LLP; Joan Taft Kluger (57) ABSTRACT

An in-situ thermal remediation method and a drip system for implementing the method. The drip water system collects data and changes its drip operation to optimize performance of the electrode. Electrical current, drip volume, drip cycle time and change in current are measured as a function of time and adjustments are made to the drip water volume and time between injections to optimize performance based on the observed current performance over time. A specialized screen delivers water where it is needed.

19 Claims, 6 Drawing Sheets

(56) References Cited

U.S. PATENT DOCUMENTS

| | | | |
|---|---|---|---|
| 3,153,342 A | 10/1964 | Pierce et al. |
| 3,438,444 A | 4/1969 | Wilkerson |
| 3,507,330 A | 4/1970 | Gill |
| 3,642,066 A | 2/1972 | Gill |
| 3,674,985 A | 7/1972 | Ragault |
| 3,678,249 A | 7/1972 | Lennox |
| 3,813,771 A | 6/1974 | Skogland |
| 3,848,671 A | 11/1974 | Kern |
| 3,862,662 A | 1/1975 | Kern |
| 3,920,963 A | 11/1975 | Beasley et al. |
| 3,948,319 A | 4/1976 | Pritchett |
| 3,958,636 A | 5/1976 | Perkins |
| 4,010,799 A | 3/1977 | Kern et al. |
| 4,084,637 A | 4/1978 | Todd |
| 4,158,764 A | 6/1979 | Yane |
| 4,228,854 A | 10/1980 | Sacuta |
| RE30,738 E | 9/1981 | Bridges et al. |
| 4,376,244 A | 3/1983 | Gellert |
| 4,376,598 A | 3/1983 | Brouns et al. |
| 4,495,990 A | 1/1985 | Titus et al. |
| 4,545,435 A | 10/1985 | Bridges et al. |
| 4,593,182 A | 6/1986 | Schwarzkopf |
| 4,662,438 A | 5/1987 | Taflove et al. |
| 4,670,634 A | 6/1987 | Bridges et al. |
| 4,721,847 A | 1/1988 | Leverenz |
| 4,900,196 A | 2/1990 | Bridges |
| 4,956,535 A | 9/1990 | Buelt et al. |
| 4,957,393 A | 9/1990 | Buelt et al. |
| 4,984,594 A | 1/1991 | Vinegar et al. |
| 4,988,427 A * | 1/1991 | Wright ............... B01D 17/06 210/220 |
| 5,011,329 A | 4/1991 | Nelson et al. |
| 5,018,576 A | 5/1991 | Udell et al. |
| 5,024,556 A | 6/1991 | Timmerman |
| 5,076,727 A | 12/1991 | Johnson et al. |
| 5,114,497 A | 5/1992 | Johnson et al. |
| 5,169,263 A | 12/1992 | Johnson et al. |
| 5,190,405 A | 3/1993 | Vinegar et al. |
| 5,193,934 A | 3/1993 | Johnson et al. |
| 5,221,827 A | 6/1993 | Marsden, Jr. et al. |
| 5,233,164 A | 8/1993 | Dicks et al. |
| 5,244,310 A | 9/1993 | Johnson |
| 5,286,141 A | 2/1994 | Vigneri |
| 5,316,411 A | 5/1994 | Buelt et al. |
| 5,318,116 A | 6/1994 | Vinegar et al. |
| 5,330,291 A | 7/1994 | Heath et al. |
| 5,347,070 A | 9/1994 | Heath et al. |
| 5,398,756 A | 3/1995 | Brodsky et al. |
| 5,420,402 A | 5/1995 | Bridges et al. |
| 5,449,251 A | 9/1995 | Daily et al. |
| 5,485,232 A | 1/1996 | Saito et al. |
| 5,545,803 A | 8/1996 | Heath et al. |
| 5,558,463 A | 9/1996 | Geisel |
| 5,621,844 A | 4/1997 | Bridges |
| 5,674,424 A | 10/1997 | Iben et al. |
| 5,769,569 A | 6/1998 | Hosseini |
| 5,907,662 A | 5/1999 | Buettner et al. |
| 5,954,452 A | 9/1999 | Goldstein |
| 5,975,799 A | 11/1999 | Carrigan et al. |
| 5,986,159 A | 11/1999 | Aines et al. |
| 5,994,670 A | 11/1999 | Buettner |
| 6,023,554 A | 2/2000 | Vinegar et al. |
| 6,073,695 A | 6/2000 | Crawford et al. |
| 6,285,014 B1 | 9/2001 | Beck et al. |
| 6,485,232 B1 | 11/2002 | Vinegar et al. |
| 6,533,499 B2 | 3/2003 | Breeding |
| 6,596,142 B2 | 7/2003 | McGee |
| 6,596,190 B1 | 7/2003 | Igawa et al. |
| 6,632,047 B2 | 10/2003 | Vinegar et al. |
| 6,824,328 B1 | 11/2004 | Vinegar et al. |
| 6,951,436 B2 | 10/2005 | Stegemeier et al. |
| 7,004,678 B2 | 2/2006 | Stegemeier et al. |
| 7,290,959 B2 | 11/2007 | Beyke et al. |
| 7,534,926 B2 | 5/2009 | Stegemeier et al. |
| 7,618,215 B2 | 11/2009 | Haemers et al. |
| 8,348,551 B2 | 1/2013 | Baker et al. |
| 8,453,739 B2 | 6/2013 | Parsche |
| 8,820,406 B2 | 9/2014 | Harris |
| 9,364,877 B2 | 6/2016 | Brady |
| 9,370,809 B2 | 6/2016 | Brady et al. |
| 9,718,103 B2 | 8/2017 | Haemers |
| 2002/0013508 A1 | 1/2002 | McGee |
| 2003/0173080 A1 | 9/2003 | Berchenko et al. |
| 2003/0173082 A1 | 9/2003 | Vinegar et al. |
| 2003/0196801 A1 | 10/2003 | Vinegar et al. |
| 2007/0023418 A1 | 2/2007 | Schlipf |
| 2008/0078551 A1 | 4/2008 | DeVault et al. |
| 2010/0089584 A1 | 4/2010 | Burns |
| 2010/0147826 A1 | 6/2010 | Schlipf |
| 2011/0295504 A1 | 12/2011 | Barber et al. |
| 2013/0202363 A1 | 8/2013 | Haemers |
| 2013/0206748 A1 | 8/2013 | Vinegar et al. |
| 2015/0001206 A1 | 1/2015 | Schlipf |
| 2015/0010359 A1 | 1/2015 | Geckeler |
| 2016/0053596 A1 | 2/2016 | Rey |
| 2016/0295641 A1 | 10/2016 | Boehmer et al. |
| 2020/0353520 A1* | 11/2020 | Seeman ............... E21B 36/04 |

FOREIGN PATENT DOCUMENTS

| | | | |
|---|---|---|---|
| CA | 1322106 C | 9/1993 | |
| CA | 2123410 C | 8/1999 | |
| CA | 2874626 C | 11/2016 | |
| CN | 108856271 A * | 11/2018 | ........... B01D 53/002 |
| CN | 110280576 A * | 9/2019 | ............. B02C 19/22 |
| DE | 69228194 T2 | 5/1993 | |
| EP | 0612273 B1 | 5/1993 | |
| GB | 671117 A | 4/1952 | |
| WO | 2005019110 A2 | 3/2005 | |
| WO | 2017131972 A1 | 8/2017 | |
| WO | 2018097875 A1 | 5/2018 | |

OTHER PUBLICATIONS

Concawe Environmental Science for the European Refining Industry Report No. 8/16, Environmental fate and effects of poly- and perfluoroalkyl substances (PFAS), Prepared ARCADIS for the Concawe Soil and Groundwater Taskforce (STF/33), Brussels, Jun. 2016.

Article on the Effect of Temperature on Volatilization of Alkali Salts During Dry Ashing of Tetrafluoroethylene Fluorocarbon Resi.

Groundwater and PFAS: State of Knowledge and Practice, Remediation and Treatment, Section 8, prepared by National Ground Water Association.

* cited by examiner

OPTIMIZED FLUX ERH ELECTRODE

BACKGROUND

Electrical resistance heating (ERH) is an in situ thermal remediation (ISTR) technology that is used to remediate contaminants from soil and groundwater. ERH uses the heat generated by the resistance of the soil matrix to the flow of electrical current to raise subsurface temperatures. ERH is equally effective in water-saturated and unsaturated (vadose zone) soils. To implement the technology, electrodes are placed throughout a targeted contaminated region. The vertical limits for ERH are set by the depth to which boreholes for electrode construction can be drilled. Electrodes may be installed vertically, at an angle or horizontally. As energy is delivered to the subsurface through the electrodes, groundwater and soil moisture are converted to steam and contaminants are removed via steam stripping and distillation. Vapor extraction and on-site treatment are used to ensure that the contaminants are captured or destroyed.

The ERH electrodes conduct electrical current into the subsurface and are designed to input electrical current into the targeted depth interval. The subsurface interval that is exposed to ERH is called the conductive interval. In the conductive interval, the electrode construction materials are electrically conductive and the borehole annulus is packed with a conductive material to increase the effective diameter of the electrode. In those portions of the subsurface where ERH is not required, the electrode construction materials are electrically insulated and the borehole annulus is filled with relatively non-conductive materials such as sand or grout. Drilled ERH electrodes are typically 20 to 30 centimeters in diameter and are often spaced 4 to 6 meters apart, although sizes and spacing outside of these common ranges are occasionally used.

An ERH power source is used to control the voltage that is applied to the subsurface. Each electrode differs in electrical phase from all of the electrodes that surround it and will thus conduct current to adjacent out-of-phase electrodes. Geometry causes the power flux or power density to be higher near the electrodes so the regions located within a few inches of the electrodes heat faster. If the soil immediately adjacent to the electrode begins to dry out, then its localized resistivity will begin to increase. This can lead to a vicious cycle because the higher resistivity results in more heating and more heating dries out the soil even further. Electrode dry out greatly reduces the performance of an electrode. It is common to introduce water into an electrode to help wet the surrounding formation and cool the electrode. Electrolytes are sometimes added to the water to improve conductivity. However, electrodes are still often limited in the amount of energy they can deliver. The primary design variables that impact an electrode's performance are the diameter of the electrode, the permeability of the soil surrounding the electrode and the moisture of soil immediately surrounding the electrode.

The energy being delivered to the subsurface can be described in terms of electrode flux. Electrode flux is measured in terms of how much total electrical power can be delivered to an electrode based on the overall outside conductive surface area of the electrode. The units of electrode flux are sometimes described in units of kilowatts per square meter. For example, a 5-meter electrode with a 0.3-centimeter diameter would have an outside conductive surface area of 4.7 square meters. If the electrode delivered 7 kilowatts of energy to the subsurface, then the electrode flux would be 1.49 kilowatts per square meter. Experimental and operational data have shown that most electrodes operate in the range of 1 to 3 kilowatts per square meter. Electrodes installed in drier, low permeability soil (clay) will generally operate at lower flux values and electrodes installed in wetter, high permeability soil (saturated sand) will operate at higher flux values.

Previous inventors have attempted to overcome the electrode flux limitations by using aggressive water injection techniques at the electrodes to cool the electrode and wet the surrounding soil. For example, a process described in U.S. Pat. No. 6,596,142 continuously injects approximately 1 liter per minute (L/min) of water into each electrode for cooling. Large inefficiencies are associated with this high volume of water injection. Water has a high heat capacity, and the high volume of injected water can actually quench the steam production that is so essential for successful remediation. Injecting large volumes of water can also result in poor heating at the bottom of a treatment volume if the water sinks and accumulates at the bottom of the electrodes. There is therefore a need for a more efficient electrode cooling and wetting system that can maximize heating efficiency by introducing calculated small volumes of water for use as injection to maintain effective cooling and wetting for optimum electrode performance. When small volumes of water are used for injection, the injections are commonly referred to as drip or drip cycles.

SUMMARY

An in-situ thermal remediation (ISTR) method is disclosed and an apparatus for implementing the method. Further disclosed is a non-transitory computer-readable medium on which is stored computer code, which when executed on one or more processors causes a computer system to perform the methods described herein. More specifically, a drip water system that collects data and changes its drip operation to optimize performance of the electrode is disclosed, which may improve electrode performance during ERH. Electrical current, drip volume, drip cycle time, and change in current are measured as a function of time, either manually or by an electronic control unit in a control system, and adjustments are manually or automatically made to the drip water volume and time between drip cycles to optimize performance based on the observed current performance over time. A specialized screen design efficiently delivers water where it is needed in electrodes of longer size, which can improve wetting and allow for longer electrode designs.

DESCRIPTION OF THE DRAWINGS

The invention is best understood from the following detailed description when read in conjunction with the accompanying drawings showing illustrative embodiments of the in-situ thermal remediation method and apparatus for implementing the method.

DESCRIPTION OF EMBODIMENTS

Figure 1:
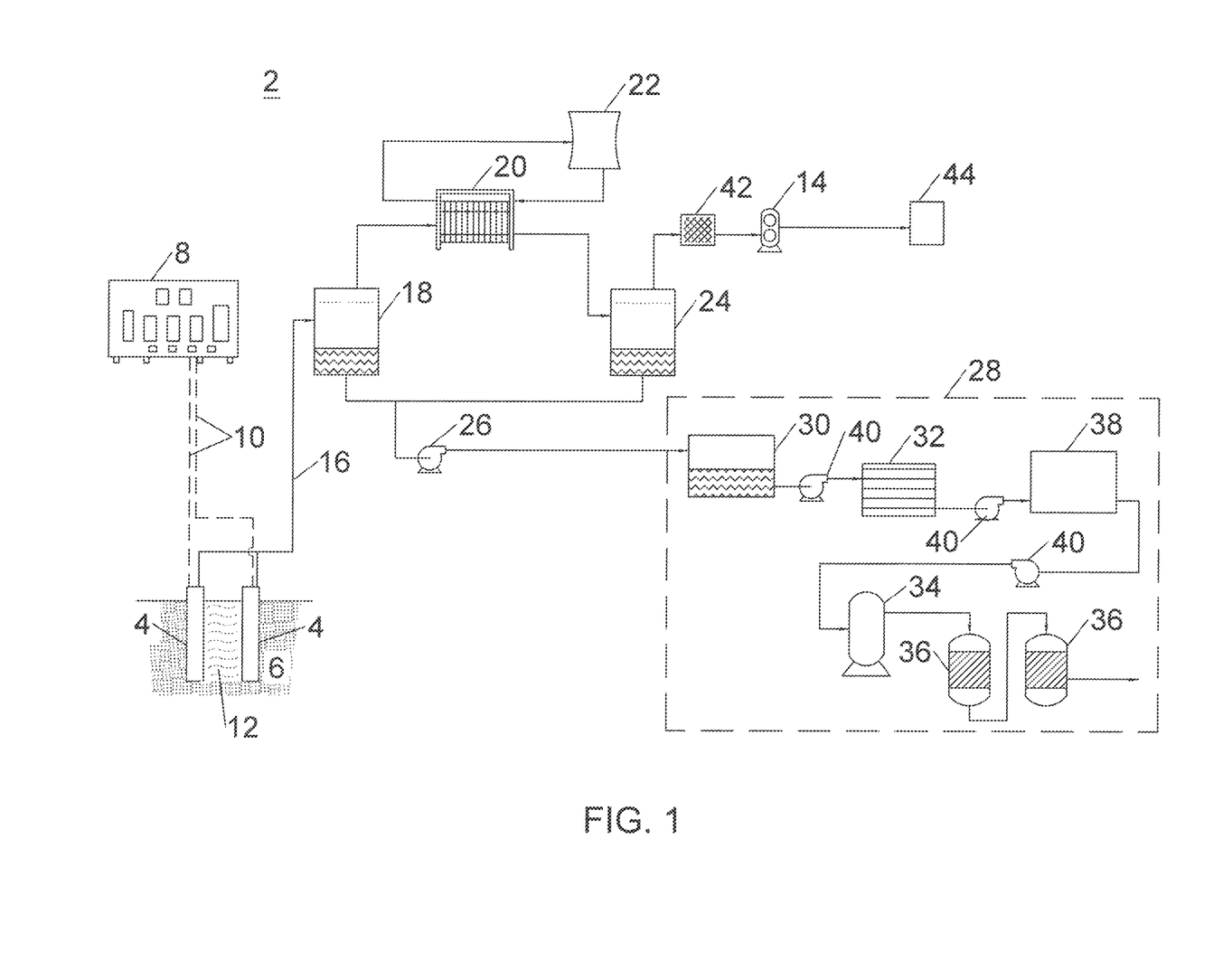
FIG. 1 depicts an illustrative ERH System.

A description of the ERH process will assist in the understanding the importance of the drip water system and methods described herein. FIG. 1 shows an illustrative ERH system 2. The system includes two or more electrodes 4 installed into the subsurface 6 for purposes of heating soil, groundwater or bedrock. Electrodes 4 are energized by a power source 8 that applies differing voltage potentials to electrodes 4 using electric cables 10. The voltage differential may be provided using alternating current (AC) or direct current (DC), although AC power is typically preferred to prevent or reduce the build-up of acids, bases and gases at electrodes 4.

Electrical current 12 passes between electrodes 4 in subsurface 6. The natural electrical resistivity of the soil, bedrock or groundwater to current flow results in heat generation that slowly heats subsurface 6. As subsurface 6 is heated, groundwater and pore water are converted into steam. The heating also converts some contaminants from the free-phase, adsorbed phase or dissolved phase into the vapor phase by distillation and evaporation. Steam generated in subsurface 6 removes contaminants by steam stripping. The steam, air and vaporized contaminants are then removed from subsurface 6 by a vacuum created from a blower 14. Steam, air and contaminants are conveyed from the subsurface 6 to vapor recovery piping 16. Piping 16 is constructed of materials rated for high temperatures and chemical compatibility to the vaporized solvents. Examples of piping materials of construction include metal, fiberglass piping and chlorinated polyvinyl chloride (CPVC).

The recovered vapors may be conveyed to a primary separator tank 18 to remove any water or contaminants that have condensed due to heat loss in the vapor recovery piping 16. However, the primary separator system 18 is not essential to the process. After the vapors pass through piping 16, and optionally through the primary separator tank 18, the vapors are conveyed through a heat exchanger 20 to condense most of the steam in the vapors into condensate. The heat exchanger may be a plate-and-frame heat exchanger, shell-and-tube heat exchanger, radiator-type heat exchanger cooled by air, or other conventional heat exchange system commonly used in the art. If heat exchanger 20 is a plate-and-frame or shell-and-tube, cooling water may be supplied to heat exchanger 20 by a cooling water system 22 which in most cases will be a cooling tower or chiller. Vapors passing through heat exchanger 20 pass through a secondary separator system 24 to remove the condensed steam from the vapor stream. Primary separator system 18 and secondary separator system 24 may be a gravity separation tank, a cyclone separation system, a combination thereof or any other commonly used separation device that is used to remove water from a two-phase flow system.

The water created by condensing steam accumulates in the bottom of primary separator 18 and secondary separator 24 and is periodically removed by one or more condensate pumps 26 and transferred to a water treatment system 28. The water treatment system is often comprised of one or more gravity separators 30 to remove solids and fuels, an air stripping system 32 to remove volatile organics, one or more water filters 34 to remove suspended solids and one or more liquid-phase granular activated carbon filters 36 to filter organics from the water. On some occasions, a chemical injection system 38 is used to adjust the chemistry of the water prior to filtration to avoid scaling and fouling of the filters with calcium carbonate or iron. For example, the chemical injection system 38 may inject an acid, a reducing agent, a biocide or a combination thereof. A combination of pumps 40 is used to convey the water from one treatment process to the other. The chemical injection system 38 may be placed at different locations of the process depending on what equipment is being protected from fouling or scaling. For example, the chemical injection system 38 is sometimes placed prior to the gravity separator 30 to introduce biocides to reduce biological growth, or chemical injection system 38 may be placed prior to the air stripping system 32 to inject sequestrants that reduce calcium or iron scale in the air stripping system 32. The use of air stripping system 32 is optional and often is not required for ERH remediation sites if volatile organic compounds (VOCs) in the condensate are low in concentration.

Vapors leaving secondary separator system 24 are typically conveyed through an air filter 42 before entering blower 14. From the blower 14, the vapors are conveyed to a vapor treatment system 44. The vapor treatment is typically comprised of one or more granular activated carbon vessels to adsorb contaminants or it may consist of a thermal or catalytic oxidation system to combust the contaminants.

Figure 2:
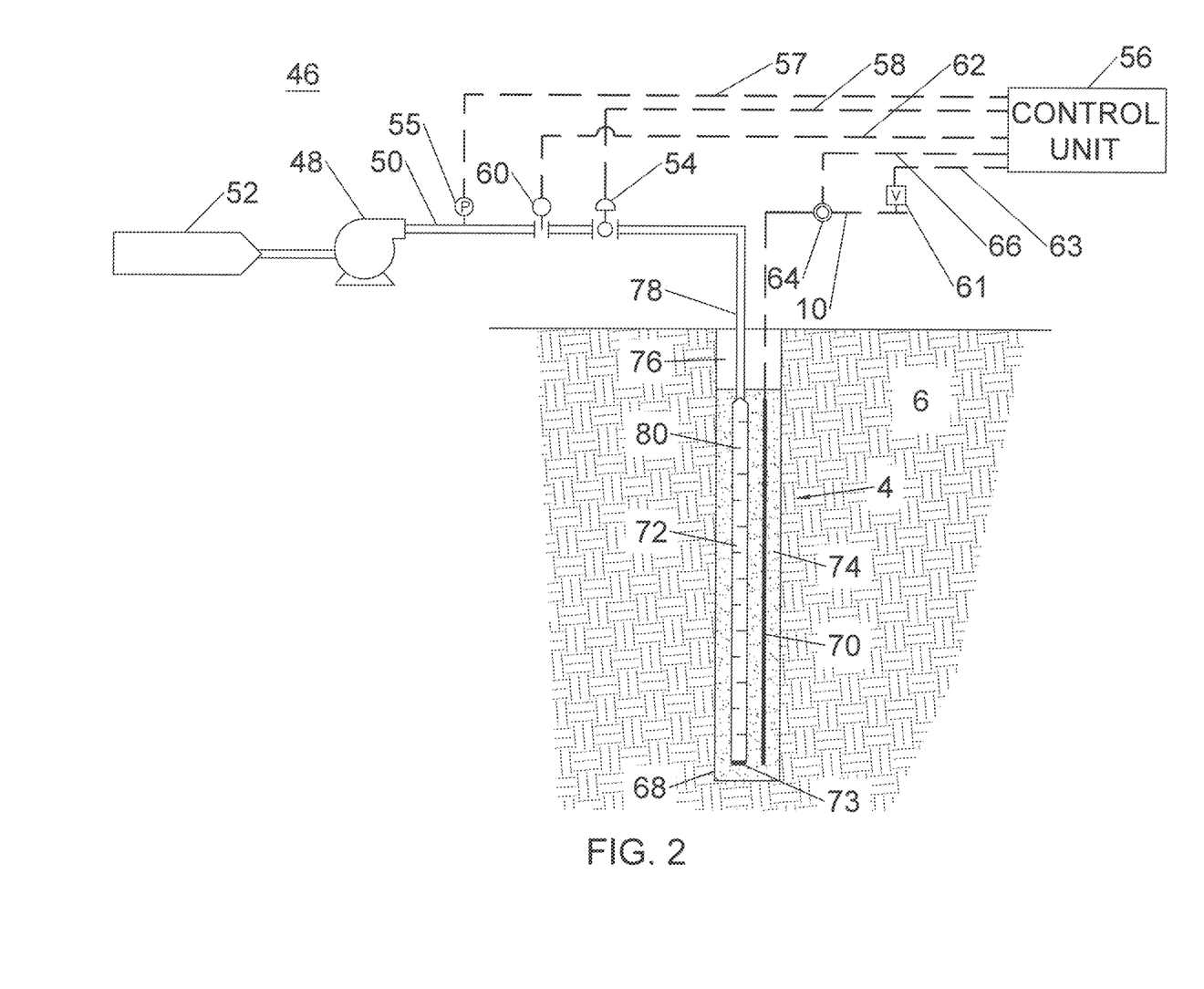
FIG. 2 depicts an illustrative embodiment of a drip system.

FIG. 2 depicts an illustrative drip system 46. Drip system 46 is an important component of the ERH system that is used to deliver water to electrodes 4 for wetting to maintain a strong electrical connection between the electrode and the surrounding soil. Drip system 46 may include a drip pump 48 that conveys water to drip piping 50 from a water source 52. The water source may be recycled condensate or any other source of water suitable for drip into the subsurface. Water source 52 may also be a potable water connection that relies on water main pressure for water delivery, eliminating the need for pump 48. Water source 52 may also be a tank of specially prepared water that includes special electrolytes such as sodium chloride. Other additives to water source 52 may include oxidants such as hydrogen peroxide, permanganate or persulfate, or combinations thereof to enhance the electrical conductivity of the water while also providing an oxidizing chemical to improve the performance of the remediation system. A regulation valve 54 controls the volume of water that flows to electrode 4 from the water source 52. Regulation valve 54 is often a solenoid valve or an actuator valve. The regulation valve 54 is controlled by a control unit 56 that communicates to regulation valve 54 by a valve signal 58, which may be a control wire communication or radio communication, for example. The volume of drip water injected into electrode 4 will vary depending on the pressure of water in drip piping 50 and the time that regulation valve 54 is open during each drip cycle. The drip piping 50 may include an optional pressure sensor 55 with pressure data transferred to control unit 56 by a pressure signal 57. A drip cycle refers to one event that the regulation valve 54 opens and closes. The volume of water entering electrode 4 during a drip cycle is measured by a flow totalizer 60. Flow totalizer 60 provides a running total of how much water has passed by through regulation valve 54 within a given time. For optimal efficiency, a single flow totalizer 60 is located close to the pump 48 so it can measure flow and correlate the flow to each individual regulation valve 54 as it is activated. The data are transmitted to control unit 56 by the totalizer signal 62 which may be a control wire or radio communication. The flow of electricity to electrode 4 is measured by a current measuring device 64, for example. This is typically a non-split core current transmitter but may consist of other in-line measuring devices such as an ammeter. The current measurement is transmitted to control unit 56 by current signal 66 which may be a control wire or radio communication, for example. In addition to current measurement, a voltage sensor 61 collects data on the applied voltage to the electrode and transmits the data to control unit 56 via voltage signal 63.

The electrode is comprised of a soil borehole 68 that has been drilled using conventional drilling techniques such as solid or hollow stem auger, air-rotary or sonic drilling. Installation may also be by direct push methods where the lithology is amenable. When borehole 68 is created, one or more conductive elements 70 and one or more drip screens 72 are placed into borehole 68 and borehole 68 is back-filled with an electrically conductive media 74. The electrically conductive media 74 typically consists of a graphite or metallic granular material, or a combination thereof, that helps to conduct electricity between electrode 4 and subsurface 6 as described and pictured in U.S. Pat. No. 7,290,959, for example, entitled Electrode Heating and Remediation Agent, incorporated herein by reference. Non-conductive portions 76 of borehole 68 are backfilled with sand or cement grout.

Drip screen 72 is typically tubular in shape with a diameter in the range of 0.5 to 3 centimeters. The material of construction is often metal, such as copper, but it may be constructed from a non-conductive material such as high-temperature cross-linked polyethylene or polytetrafluoroethylene, for example. Drip screen 72 can be designed to target different depth intervals in the vadose and saturated zones when more than one drip screen 72 is used in an electrode 4. For example, the number and distribution of openings in the screen may be varied to affect the distribution of water in the vadose and saturated zones. The length of drip screen 72 may also be designed to target particular depth intervals. Drip screen 72 is typically connected to a heat-resistant and non-conducting tubing 78 that may consist, for example, of polytetrafluoroethylene or high-temperature cross-linked polyethylene. Drip screen 72 can be extended as long as the length of conductive media 74 or shorter distances for economic purposes. In an illustrative embodiment, optimum performance is achieved with a drip screen 72 that extends across at least 75 percent of conductive media 74. In some cases, the drip screen 72 also extends above the conductive media 74 into a sand interval in the non-conductive interval 76 to distribute drip water into a porous media above the conductive media 74 or better distribution. Illustrative ranges of drip screen size include drip screen 72 extending only five percent of the conductive media 74 thickness for electrodes that are installed at a permeable site with a shallow water table to 100 percent for electrodes installed in unsaturated, low-permeability soil. The closed end of drip screen 72 is typically sealed with a cap 73 or it is compressed closed so that drip water is diverted instead through openings 80.

In a short electrode 4, drip screen 72 may consist of a standard screen with uniform openings such as standard slotting. However, for optimum performance in longer electrodes, openings 80 are created in the side of the drip screen 72 to preferentially divert water to different areas in conductive media 74. In one embodiment, openings 80 are created on alternating sides of drip screen 72. Openings 80 can be created by partially slotting, by drilling holes, or a combination thereof. Slotted openings are typically about 0.05 centimeters thick but can be as thin as 0.02 centimeters and as thick as 0.5 centimeters. These openings are typically cut 30 percent of the diameter into the drip screen material but can be as shallow as 5 percent or as deep as 70 percent. Drilled circular openings are typically between 0.15 to 0.3 centimeters in diameter but can be as small as 0.03 centimeters to 1.3 centimeters in diameter. The size of the openings in a drip screen are typically the same size but can be varied for variable water distribution.

Variable (non-uniform) spacing can be used to optimize water delivery along the length of drip screen 72, especially for longer electrodes. For optimal water delivery, the spacing of these openings is distributed along the length of the screened interval in an array similar to an exponential decay function $y=e^x$. This means there will be more openings higher on drip screen 72 at shallower depth intervals and fewer openings at deeper depth intervals. This prevents the problem of injected water wanting to preferentially accumulate at the bottom of the electrode.

For angled or horizontal electrodes, variable or standard spacing can be used, depending on the degree of the angle. For horizontal electrodes, variable spacing in low pressure injection conditions with partial pipe flow may be opposite of vertical electrodes with fewer openings 80 located closer to the water source and more openings 80 located further from the water source where the in-line pressure is reduced. This means there may be less openings where there is a higher water pressure and higher flow rate, and more openings where there is a lower pressure and lower flow rate. Alternatively, standard spacing is effective in horizontal drip tubes as long as the openings are small, and at higher pressure designs with full pipe flow, the spacing may follow a similar pattern to a vertical screen. Small openings may help to maintain pressure along the full length of the drip screen, providing even drip across the desired interval. Conductive media 74 distributes this moisture to the outside surface of borehole 68 in a relatively uniform distribution.

Figure 3:
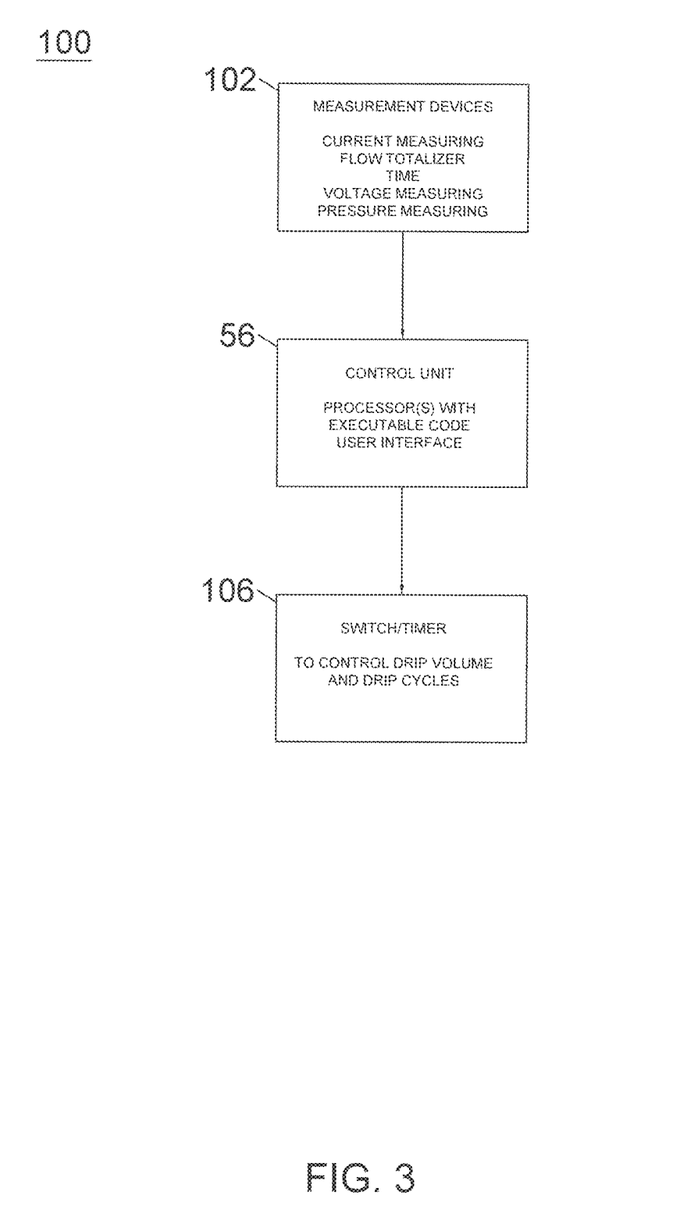
FIG. 3 is a block diagram of an illustrative control system.

FIG. 3 is a block diagram providing an overview of components of an illustrative control system for drip system. Control system 100 controls water flow in drip system 2. It includes measurement devices 102, such as current measuring device 64, flow totalizer 60, regulation valve 54 activation, pressure sensor 55 measurement and voltage sensor 61 measurement. Data from measuring devices 102 are input to a control unit 56. Control unit 56 may include one or more processors having machine readable code, which when executed implements the methods of regulating flux described herein by controlling water regulation valve 54. Control system 100 may implement continuously modulated control. To do so, it compares the current and water flow values as functions of time with the desired value, i.e. a threshold value. It then outputs or applies the difference as a control signal to regulate a timer or switch 106 to control the time a water regulation valve is open and to bring the process variables in line with the threshold values. Thus, the three main components 102, 56, 106 of control system 100, correlate to sensing, analyzing and acting, respectively.

The machine readable code includes algorithms, such as those to analyze the input signals from measurement devices 102 to produce control signals to adjust the time that water regulation valve 54 is open, the drip volume added during a drip cycle and the time in between drip cycles. Electronic control unit 56 may also include a user interface, which, by way of example, may be a display screen or non-graphical user interface. The user interface may provide a user with information from control unit 56, measurements devices 102 and switch or timer 106.

A control system 100 includes a control unit 56 that collects data from flow totalizer 60 via the totalizer signal 62 and from a current measuring device 64 via current signal 66. Control unit 56 monitors current from current measuring device 64 to determine if electrode "dry-out" is occurring. It does this by comparing the operating current to the operating current defined at an earlier point in time that is considered a characteristic optimal operating current for electrode 4. Control system 100 is programmed to note when the optimum operating current falls from optimum operating current by a specific percent. For example, the program may be set to activate drip to electrode 4 if the current to the electrode falls below 10 percent of the optimum operating current. The actual percentage of current drop required for a drip cycle response in the program will be site specific and it is input into the program by those experienced in the art after observing initial electrode performance at a site, but a drop in the range of 5 percent to 15 percent may be considered an average range for a programmable response. An automated drip response may also be added at timed intervals to test the conditions of operation by adding higher and lower drip volumes and evaluating the response in current.

One important feature of control system 100 is that it eliminates or reduces the unnecessary injection of water into electrode 4 when drip water is not needed, thus it may provide for faster heating than a system that uses a continuous water injection. If control unit 56 does not detect a drop in current that is considered significant (for example greater than 5 percent) in comparison to the optimum current, then no drip water is sent to the electrode.

Each time a drip cycle occurs, the volume of injected drip water is measured by flow totalizer 60 and the data is transmitted to the control unit 56 via totalizer signal 62. The drip volume is stored in a database within control unit 56 for future reference. The next time a drip cycle is activated, the volume of injected water may be decreased slightly by adjustment of the time that regulation valve 54 remains open. For example, a typical cycle may have regulation valve 54 open for a time frame somewhere between 20 to 60 seconds. The next time the drip cycle activates, the drip cycle may be reduced by 0 to 10 percent to reduce the drip volume by a specific target in comparison to the previous drip volume. Control unit 56 then monitors if the decrease in drip volume results in a decrease in the time between drip cycles. If the time has not changed, then control unit 56 defaults to a lesser drip volume during the next drip cycle to improve efficiency. If the time between drip cycles is shorter due to the smaller drip volume, control unit 56 keeps the drip volume at its standard set point. Similarly, a higher drip volume may be used with monitoring to determine if the increased drip volume resulted in a proportional increase in current to the electrode. If the current increases or the time between drip cycles is expanded to result in an overall reduced water input into the electrode, then control unit 56 will default to the higher drip volume as the standard drip volume for subsequent drip cycles.

The control logic at control system 100 utilizes specific rules or presumptions of operation with associated activation responses to optimize the electrode performance. For example, there is a presumption that a positive response in current will occur when drip water is added to an electrode. If a positive response in current is not observed, then the associated response is to discontinue drip water addition. There is also a presumption that the current flow will increase if drip water volume is increased but that the negative effects of adding drip water will outweigh the benefits at some specific drip volume per drip cycle. Therefore, adding more drip volume in incremental amounts will continue as long as proportional positive increases in current flow are observed, but drip volume increases will be discontinued when further water addition does not result in a statistically significant increase in current. A response to an observation of no current increase with drip water injection is to decrease the drip volume on the next drip cycle. By storing the data and analyzing typical time between drip cycles, future drip trends can be predicted and notification provided when the data do not fit prior data trends. This also allows for initiation of drip cycle adjustments in advance of anticipated regulation valve 54 activations to maintain an optimum drip volume.

Another variable used in the initial programming of control system 100 involves an understanding of the quantity of water that can be boiled at each electrode. It is reasonable to assume that drip water added to an electrode will eventually be converted into steam. Therefore, the energy used to convert drip water to steam at an electrode should be minimized to only a small percentage of the total energy delivered by the electrode. In the most efficient ERH operations, the energy used to evaporate drip water should be less than 20 percent of the electrode operating energy, and preferably less than 10 percent. Control system 100 calculates the percent of energy going to drip water evaporation at an electrode using input data from current measuring device 64 and flow totalizer 60 in combination with a voltage reading obtained from voltage sensor 61.

Control system 100 also has the capability of detecting problems with drip at specific electrodes based on observed deviations between the drip volume and drip cycle time over time. If the drip cycle time is noted to substantially increase to inject a fixed drip volume, then the longer drip cycle time may indicate a partially plugged drip screen 72. On the other hand, if the drip cycle time is noted to be substantially less than normal for a fixed drip volume, then the shorter drip cycle time may be an indicator of a leak in drip piping 50. Low pressure readings at pressure sensor 55 would also be an indicator of a potential leak. Control system 100 may be programmed to identify these anomalies and provide notification that maintenance may be required.

Figure 4A:
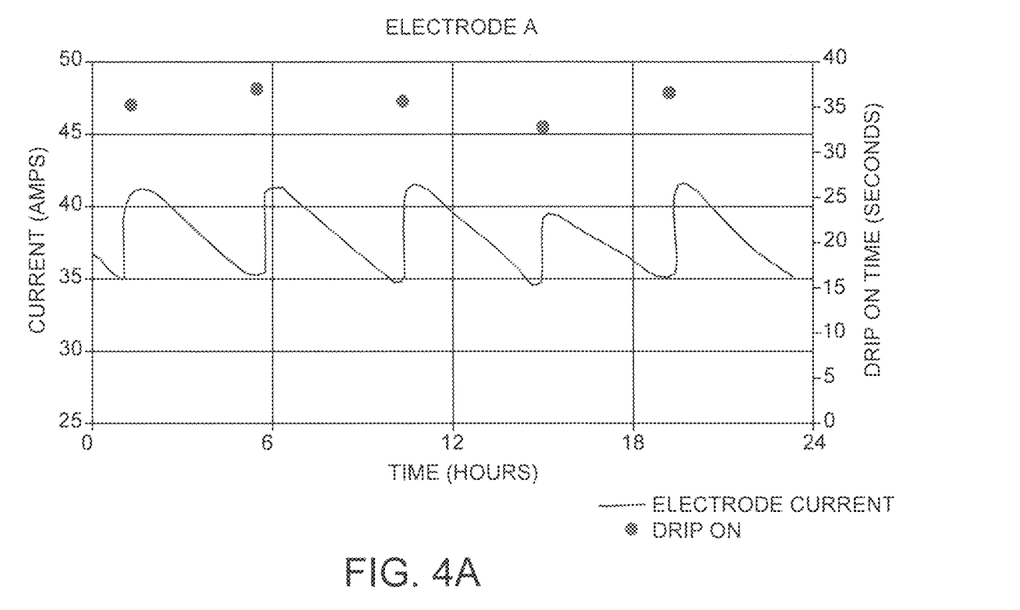
FIG. 4A shows a current pattern with automatically adjusting drip system.
Figure 4B:
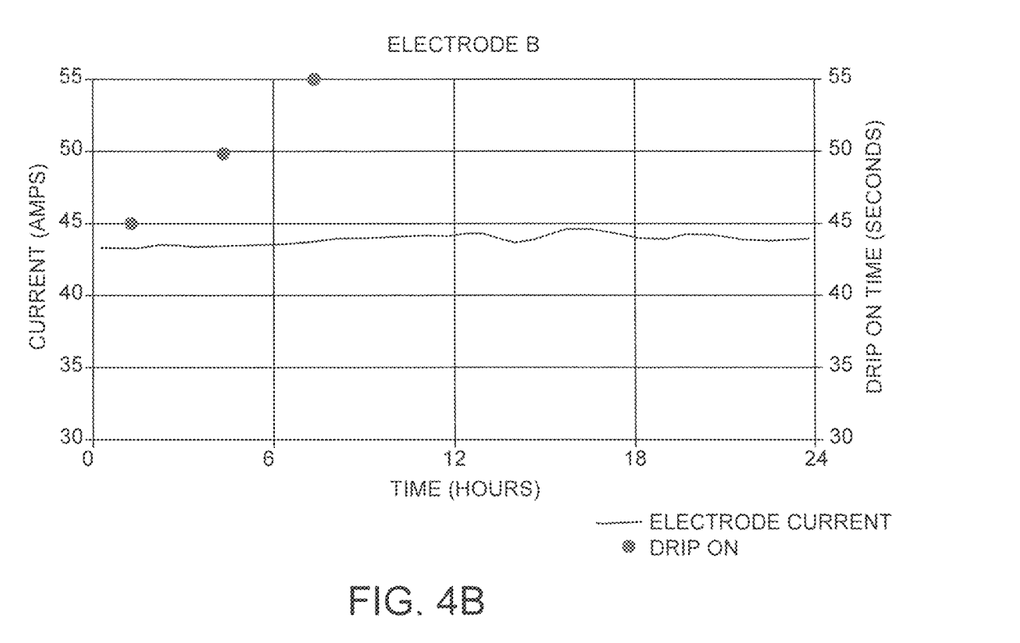
FIG. 4B shows an electrode current pattern requiring no drip water.

Examples of the drip system in activation are shown in FIGS. 4A and 4B. In FIG. 4A the optimum operating current for Electrode A was determined to be approximately 40 amps during the initial phases of operation. The control system 100 was programmed to provide a 10-liter drip volume over a 35-second drip cycle where regulation valve 54 was opened for a period of 35 seconds by valve signal 58 from control unit 56. After the 10 liters of drip water was injected, regulation valve 54 was closed. The addition of drip water resulted in wetting of the electrode that allowed the electrode performance to immediately increase to its optimal operating current. Over a time period ranging from 4 to 4.5 hours, the current would slowly decrease at the electrode until the current reached 35 amps and then the drip cycle was reactivated. After the first cycle, the drip volume was increased by 8.6 percent by increasing the drip cycle from 35 seconds to 38 seconds. With this increase in drip volume, no observable increase in current was observed in comparison to the current at 35 seconds. Therefore, the next drip cycle was adjusted down to 35 seconds. A subsequent drip cycle was adjusted down even further by 8.6 percent to 32 seconds. In this drip cycle, the current peak was not as high and only peaked at 39 amps. As a result, the next drip cycle was re-adjusted back to 35 seconds. Using this programmed drip system, the drip system cycled approximately five to six times per day for Electrode A, delivering approximately 50 to 60 liters of water to the electrode to maintain optimum performance. If we compare this to an electrode that continuously delivers 1 liter per minute, the volume of injected water is reduced by approximately 96 percent, thus allowing for much more efficient heating.

FIG. 4B shows that Electrode B started its operations at approximately 43 amps. A single drip cycle of 14 liters of water delivered over 45 seconds showed no improvement of electrode performance during early stages of operation. Two subsequent drip cycles 15.8 and 17.3 liters with cycle times of 50 and 55 seconds, respectively, were performed to test the conditions of operation. The increased drip volumes showed no change in current. Because no drop or increase in current was detected with drip and increased drip volume, no additional drip water was added to the electrode. When no drop in current was noted with the absence of drip, the drip cycle was instructed to remain off unless a subsequent drop in current is noted.

It should be noted that although the optimized drip system described herein and its equivalents utilize a control system to make rapid and efficient adjustments to optimize electrode performance, the same adjustments can be made in a manual mode without the use of the control system without deviating from the intended scope of the invention.

Figure 5:
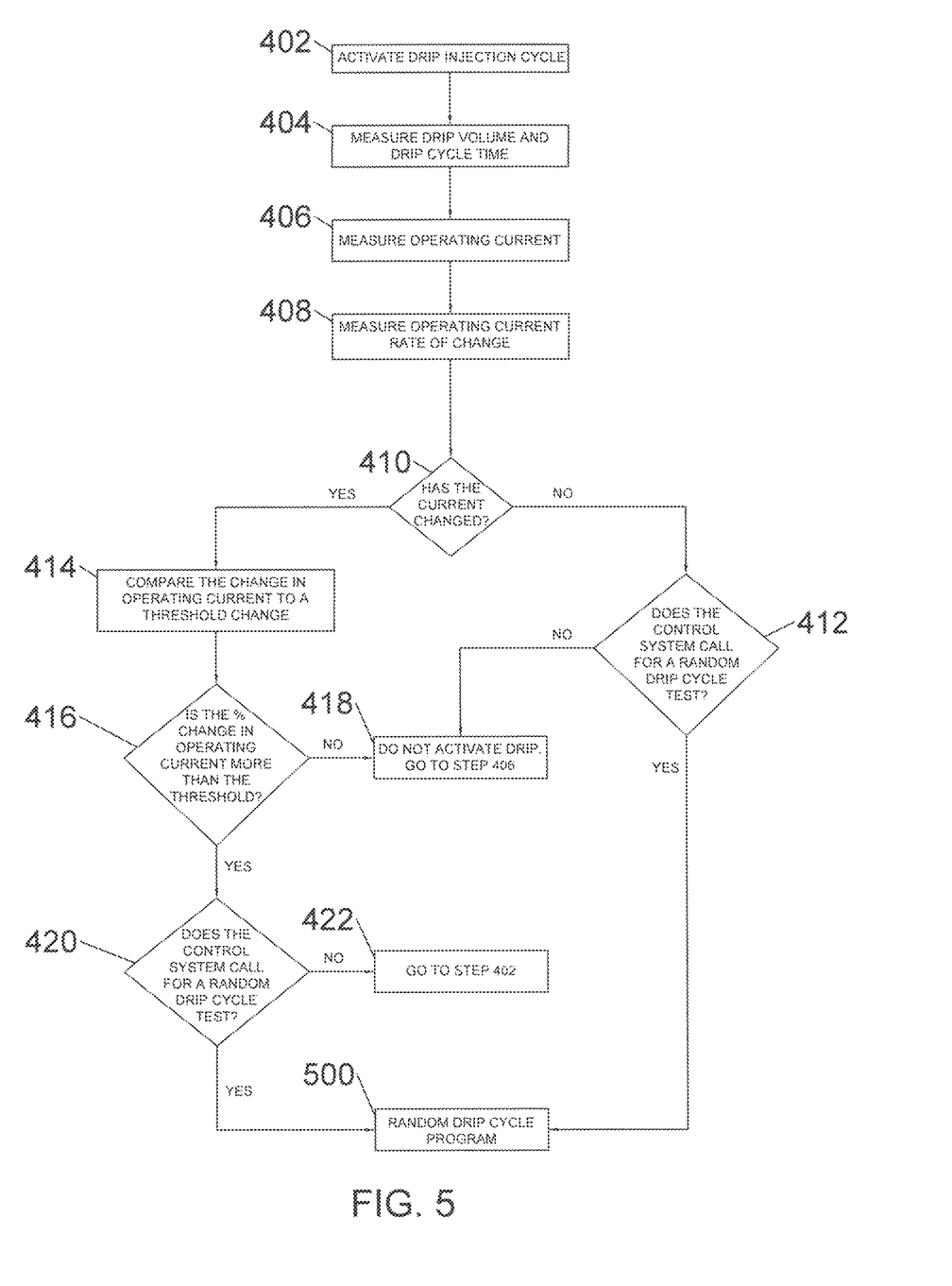
FIG. 5 is a flow chart of an illustrative method of regulating flux in an ERH electrode.

FIG. 5 is a flow chart that illustrates an embodiment of an exemplary method. In step 402 the drip cycle is activated by activation of regulation valve 54. In step 404, the drip volume and drip cycle time are measured. This is performed by measuring the volume of injected drip water during the time that regulation valve 54 is open until the time that regulation valve 54 is closed. Note that a single activation of regulation valve 54 is called a drip cycle. In step 406 the electrical operating current is measured by current measuring device 64 at specific time intervals defined in the programming of control system 100. In step 408 these measurements are input to a control unit 56. Control unit 56 compares the operating current to an operating current at an earlier point in time to establish a change in operating current. The comparison may be performed by time averaging of multiple readings from specific time intervals or by directly monitoring the rate of change over a given time interval. Control unit 56 determines whether a change has occurred in operating current from the operating current at an earlier time. Control unit 56 can establish this as a percent change in operating current from the earlier point in time. If a change in current has not occurred, then as represented in block 412, the control system 100 will determine if a random drip cycle test is appropriate based on the amount of time that has passed since a previous random drip cycle test was conducted. If the control system 100 activates a random drip cycle test, a random drip cycle program 500 will be initiated. If the control system does not call for a random drip cycle test, then the solenoid will not be activated as shown in step 418 and the flowchart is directed back to step 406.

If it is determined that a change in current has occurred in step 410, then the control system 100 will compare the change in operating current to a previously determined threshold change value in step 414. In step 416, the control system 100 will decide on a drip procedure based on if the percent change in operating current is more than a previously determined threshold value. If the percent change is not more than the threshold value, then step 418 will occur where the drip cycle is not activated and the flowchart is directed back to step 406. If the percent change is more than the threshold value, then a drip cycle will be activated based on a decision of whether to implement a random drip cycle test at step 420. If a random drip cycle test is not activated, then the flowchart is directed back to step 402 where a normal drip cycle is activated. If the program determines that a random drip cycle will occur, then the control system 100 activates a drip cycle as described in the random drip cycle program 500.

Figure 6:
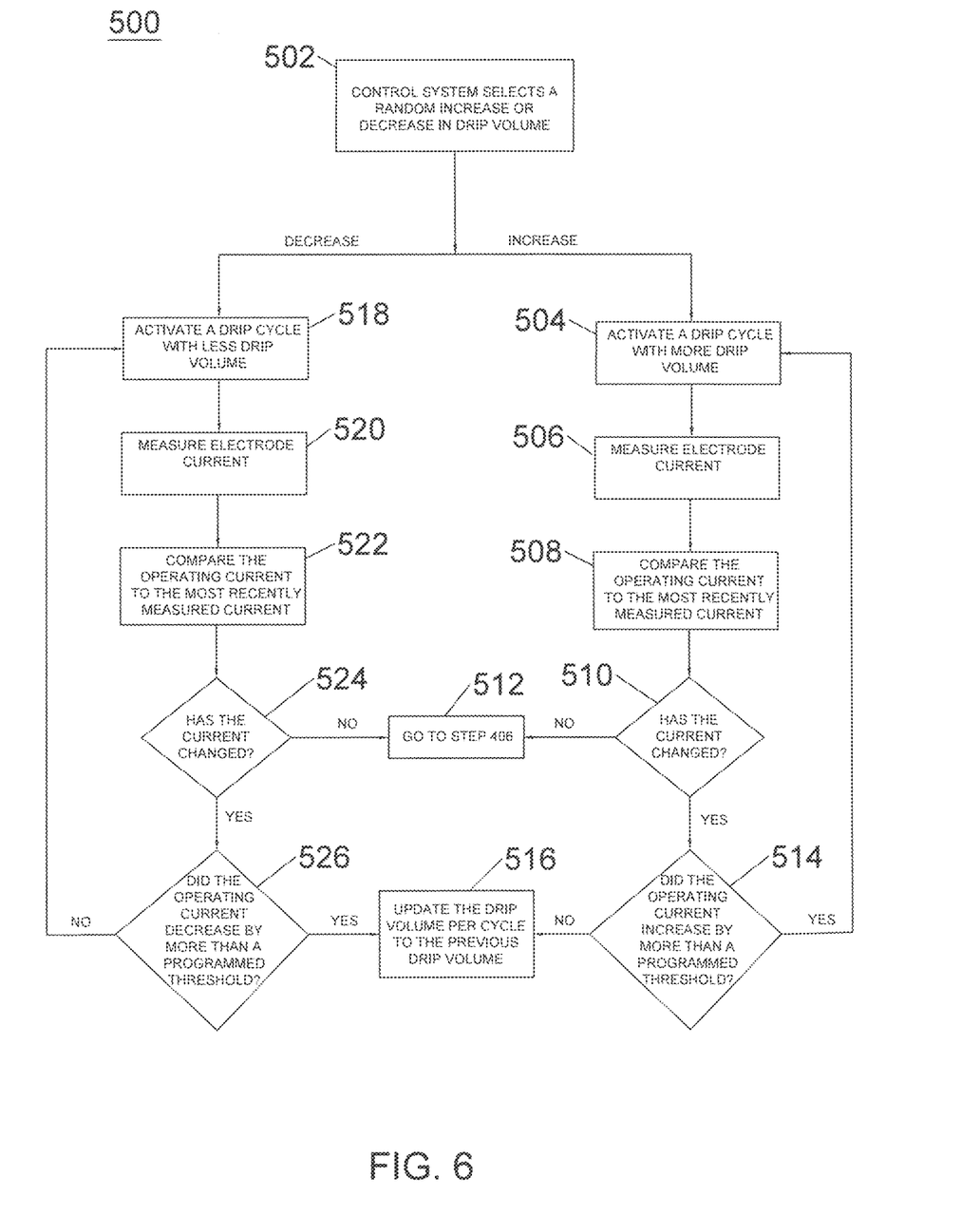
FIG. 6 is a flow chart of an illustrative method of testing flux optimization.

FIG. 6 is a flow chart that illustrates an embodiment of an exemplary method. A random drip cycle program 500 is illustrated. In step 502 the control system 100 selects a random increase or decrease in drip volume to test the conditions of operation. If control system 100 selects a random drip cycle program that increases the drip volume, the regulation valve 54 is activated for a longer period of time in step 504 than its previous drip cycle to inject a larger drip volume, typically in the range of 5 to 15 percent more. The current is then measured in step 506 by the current measuring device 64 and the current is compared to a recent prior operating current in step 508. In step 510 a decision is made as to whether there is a change in the compared currents. If the current measured in step 506 has not changed in comparison to a recent prior operating current measurement, then the process is directed back to step 406 where measurement of current continues. If the current measured in step 506 has increased, then is step 514, it is determined whether the current increased by more than a programmed threshold in comparison to a recent prior operating current measurement. If the increase is greater than the threshold, then the process is directed back to step 504 where the drip volume is again increased for another round of evaluation. If the current measured in step 506 has not increased by more than a programmed threshold in comparison to the current measured in a recent prior operating current measurement, then step 514 directs the control system 100 to update the required drip volume per drip cycle to be the previous drip volume used in step 516.

If in step 502, the control system 100 selects a random decrease in drip volume to test the conditions of operation, then the regulation valve 54 will be activated for a shorter period of time in step 518 in comparison to its previous drip cycle to deliver a smaller drip volume. The current is then measured in step 520 by the current measuring device 64 and the current is compared to a recent prior operating current in step 522. Step 524 is a decision point where it is determined if there is a change between the compared currents. If the current measured in step 520 has not changed in comparison to a recent prior operating current measurement, then in step 526 the process is directed back to step 406 where measurement of current continues. If, in step 526, the current measured in step 520 decreased by more than a programmed threshold in comparison to a recent prior operating current measurement, then the process is directed to step 518 where control system 100 updates the required drip volume for subsequent drip cycles to the previous drip volume used. If the current measured in step 520 has not decreased by more than a programmed threshold in comparison to the current measured in a recent prior operating current measurement, then in step 526 drip the process circles back to step 518 where the drip volume is again decreased for another round of evaluation.

Various embodiments of the invention have been described, each which may have a different combination of elements. The invention is not limited to the specific embodiments disclosed, and may include different combinations of the elements disclosed, omission of some elements or the replacement of elements by the equivalents of such structures or steps.

While the invention has been described by illustrative embodiments, additional advantages and modifications will occur to those skilled in the art. Therefore, the invention in its broader aspects is not limited to specific details shown and described herein. Modifications, for example, to order of components, dimensions and materials, and incorporation of equivalent components, may be made without departing from the spirit and scope of the invention.

The invention claimed is:

1. A method of regulating flux in an electrical resistance heating (ERH) electrode comprising:
 measuring operating electrical current to the ERH electrode, drip volume of water entering the ERH electrode, drip cycle time and change in current, all as a function of time; and
 adjusting drip volume and drip cycle time based on the measured operating electrical current.

2. The method of claim 1 comprising:
 comparing the operating electrical current to an operating electrical current measured or defined at an earlier point in time to establish a percent change in operating current;
 comparing the percent change in operating electrical current to a threshold percent;
 if the percent change is above the threshold percent, activating a drip cycle to the electrode; and
 if the percent change is below the threshold percent, not activating a drip cycle to the electrode.

3. The method of claim 2 comprising:
 measuring by a flow totalizer the volume of injected drip water entering the electrode during a drip cycle and sending a totalizer signal representing the volume of injected drip water during the drip cycle to a control system; and
 measuring by a current measuring device the operating current during a drip cycle and sending a current signal representing the operating current to the control system;
 wherein the control system has computer executable instructions executed by a processor to perform the method comprising:
  receiving the current signal, totalizer signal, and the percent change in current;
  analyzing the measured operating electrical current, drip volume, and change in current; and
  sending a valve signal to the regulation valve to control drip volume entering the electrode.

4. The method of claim 3 comprising:
 storing the volume data in the control system;
 storing the operating electrical current data in the control system; and
implementing a control loop to continually monitor and adjust the drip volume.

5. The method of claim 4 further comprising:
 based on the stored volume data as a function of time and operating electrical current data as a function of time, predicting upcoming drip cycle adjustments needed; and
 initiating the needed drip cycle adjustments in advance of anticipated regulation valve activations to maintain an optimum drip volume.

6. The method of claim 3 wherein a random drip cycle program is initiated to test an increase or a decrease in drip volume to further optimize drip volume.

7. The method of claim 3 where voltage, current and drip volume data over time are collected and processed to provide information on how much electrode energy is being spent on evaporation of drip water.

8. The method of claim 3 where pressure, drip cycle and drip volume data are collected and processed to provide notification of plugging or leaking in the electrode drip system.

9. The method of claim 4 comprising:
 monitoring changes in drip volume of drip water over time; if a decrease in drip volume results in a decrease in the time between drip cycles, and if the total drip volume over time has not increased, defaulting to a reduced drip volume during a next drip cycle; and
 if the time between drip cycles is shorter due to the smaller drip volume, and if the total drip volume over time increases as a result, keeping the drip volume at its standard set point.

10. A drip system for use with an electrode in a borehole, the drip system comprising:
 a control system;
 a water regulation valve configured to control drip water volume that flows or is pumped to an electrode from a water source, the water regulation valve controlled by a valve signal received from the control system;
 a flow totalizer configured to measure the volume of water entering the electrode during a drip cycle and transmit the drip volume to the control system by a totalizer signal;
 a current measuring device configured to measure electrical current to the electrode and transmit the current measurement to the control system by a current signal; and
 one or more drip screens disposed in the electrode and having openings through which the water flows, the drip screen configured to affect water distribution into a surrounding environment.

11. The drip system of claim 10 wherein the drip screen has openings in sides of the drip screen configured to preferentially divert water to different areas in a conductive media within the electrode.

12. The drip system of claim 10 wherein the openings are on alternating sides of the drip screen.

13. The drip system of claim 11 wherein the drip screen openings are varied in size for variable water distribution.

14. The drip system of claim 11 wherein spacing of the drip screen openings is varied.

15. The drip system of claim 10 wherein the drip screen has more openings at shallower depth intervals and fewer openings at deeper depth intervals.

16. The drip system of claim 10 wherein the electrode is angled or horizontal and the drip screen has fewer openings in regions of higher water pressure and more moving toward lower pressure areas.

17. The drip system of claim 10 wherein at least one of the one or more drip screens has the openings are distributed along the length of a screened interval with a greater number of openings higher on the drip screen at a shallower depth interval and fewer openings at deeper depth intervals.

18. The drip system of claim 17 wherein the at least one of the one or more drip screens has the openings are distributed in an array following an exponential decay function.

19. A non-transitory computer-readable medium on which is stored computer code, which when executed on one or more processors causes a computer system to perform a method comprising:
 measuring operating electrical current to the electrode, drip volume and change in current, all as a function of time;
 measuring drip cycle time; and adjusting drip volume and drip cycle time based on the measured electrical current.

\* \* \* \* \*